United States Patent [19]

Stevens et al.

[11] 4,030,096
[45] June 14, 1977

[54] AUTOMATIC TARGET DETECTOR

[75] Inventors: Wesley E. Stevens; Frederick Brimberg, both of Severna Park, Md.

[73] Assignee: Westinghouse Electric Corporation, Pittsburgh, Pa.

[22] Filed: Dec. 5, 1975

[21] Appl. No.: 637,999

[52] U.S. Cl. .............................. 343/5 CM; 340/3 R; 340/3 F; 343/5 PD; 343/17
[51] Int. Cl.² ...................... G01S 9/02; G01S 7/04; G01S 9/66
[58] Field of Search ......... 340/3 R, 3 F; 343/5 CM, 343/5 PD, 17

[56] References Cited

UNITED STATES PATENTS

| | | | |
|---|---|---|---|
| 3,304,532 | 2/1967 | Nelkin et al. | 343/5 CM |
| 3,437,834 | 4/1969 | Schwartz | 340/3 R |
| 3,451,038 | 6/1969 | Maass | 340/3 R |

Primary Examiner—Maynard R. Wilbur
Assistant Examiner—S. C. Buczinski
Attorney, Agent, or Firm—D. Schron

[57] ABSTRACT

Apparatus which automatically detects targets of interest in line scanned amplitude modulated data systems such as side scan radar or sonar. The apparatus examines a received signal for target highlights followed by a target shadow of a certain length, depending upon range. The apparatus indicates the presence of a target of interest when the highlight-shadow information is contained in multiple sequential signals over a predetermined range window.

12 Claims, 14 Drawing Figures

AUTOMATIC TARGET DETECTOR

BACKGROUND OF THE INVENTION

1. Field of the Invention

The invention in general relates to automatic target detection apparatus, and particularly to such apparatus for use in side-looking sonar or radar systems.

2. Description of the Prior Art

In side scan, or side-looking energy systems, a carrier traveling over the target area repetitively transmits pulses of energy to illuminate the target area and energy reflected from narrow adjacent strips on the target area is portrayed as a line-by-line picture that is a pattern of highlights and shadows analogous to an optically viewed panorama illuminated by side lighting, with objects outlined in such a way as to permit their identification.

Such apparatus may be used, for example, for military missions, scientific observations, geological surveys, or inspection purposes, to name a few.

For various missions, an operator must continuously view the displayed picture so as to locate possible targets of interest. During the course of a relatively long mission, and due to the relative difficulty of picking out a target in some displays, the viewer often can miss the accurate determination of targets of interest.

SUMMARY OF THE INVENTION

The apparatus of the present invention automatically detects targets of interest and indicates the detection to the operator such as by visual or audio means and/or marking the target location on the display.

The multiple signals of the system, indicative of the target area, are examined for signal levels above a first predetermined threshold indicative of a target highlight, and below a second predetermined threshold indicative of a shadow of the target. A first circuit means responsive to the signals determines the presence of a highlight exceeding a predetermined duration and a second circuit means determines the presence of a shadow in addition to the duration of the shadow as a function of its position in the signal.

Depending upon the mission, the apparatus may be operable to indicate targets only if the highlight and shadow combination are present in adjacent received signals at positions falling within a predetermined range window.

DESCRIPTION OF THE PREFERRED EMBODIMENT

Figure 1A:
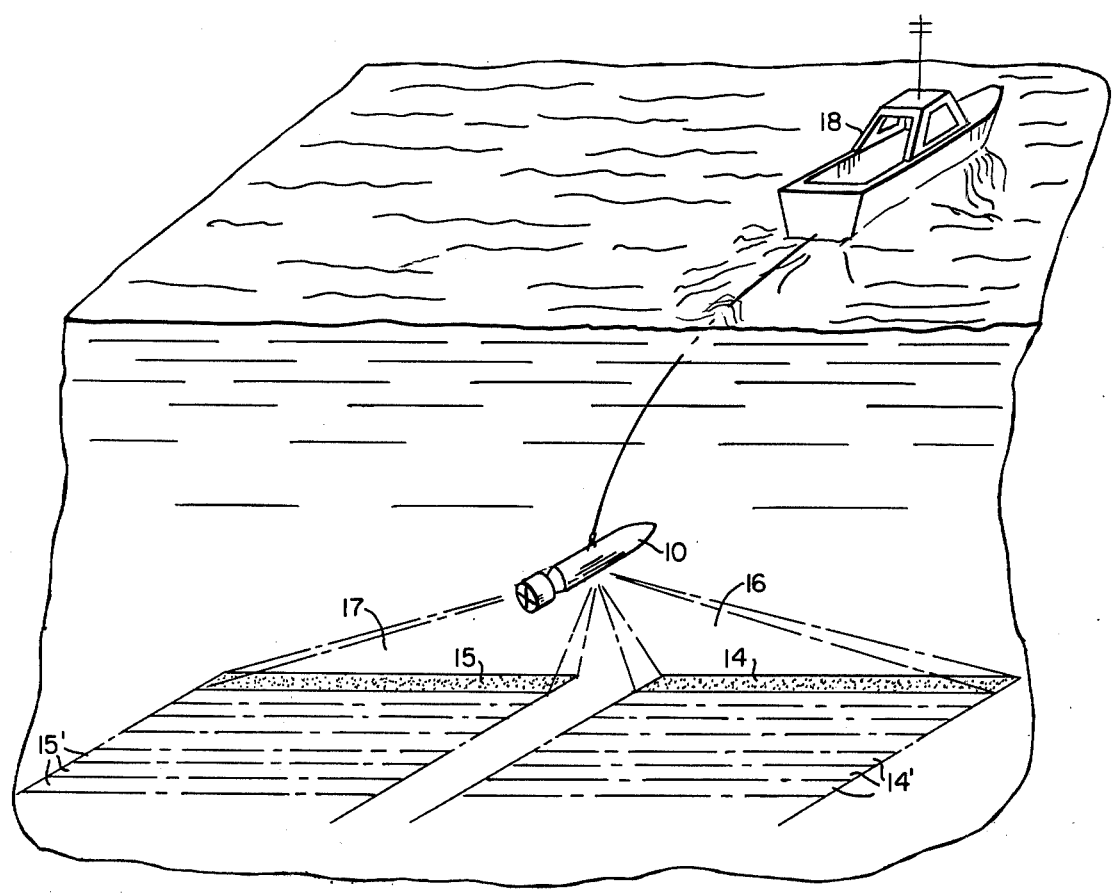
FIGS. 1A and 1B illustrate, respectively, single-beam and multi-beam side-looking sonar systems.

Although the invention is applicable to various types of sensor systems providing line scanned amplitude modulated signals indicative of a target area of interest, it will be described with respect to a side-looking sonar system one example of which is illustrated in FIG. 1A. Side-looking sonar transducers mounted on carrier 10 periodically transmit acoustic energy pulses in a certain pattern such that the sound energy impinges upon the bottom 12 and scans, or sweeps out elongated narrow insonified strips 14 and 15 produced by starboard and port transducers respectively. The apparatus forms relatively narrow starboard and port receiver beams 16 and 17 whereby reflected acoustic energy from strips 14 and 15 containing information relative to the bottom, or targets on the bottom, is picked up by receiving transducers and processed and displayed.

The carrier 10 may be towed through the water by means of a surface vessel 18 or the apparatus may be mounted directly on an undersea vehicle. As the carrier proceeds along a course line, multiple sequential acoustic transmissions (pings) take place such that multiple adjacent areas 14', 15', on the bottomm are insonified. Areas 14 and 15 represent the strip presently being insonified whereas the strips 14' and 15' represent previously insonified strips from which information has been received. That is, each return signal contains information, and collectively the return signals, are indicative of a sound picture of the target area over which the apparatus travels.

Figure 1B:
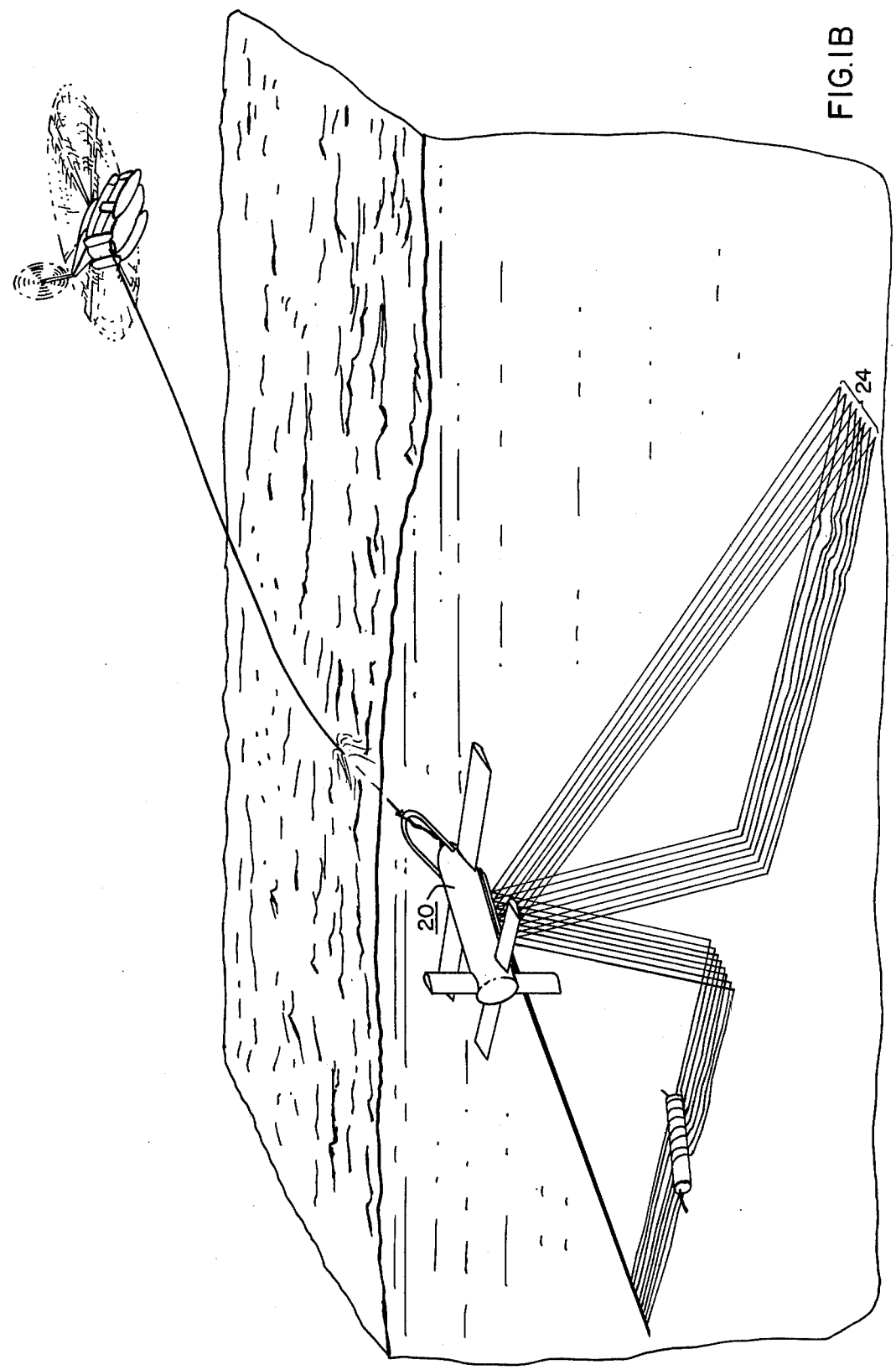

FIG. 1A illustrates, with respect to one side of the carrier, a single-beam system. In order to increase the area covered per unit of time, use is made of a multi-beam system such as illustrated in FIG. 1B wherein the carrier 20 may be towed by a relatively fast surface vessel or as illustrated, by a helicopter 22. With the multi-beam system, a single pulse insonifies a portion of the target area slightly greater than the area covered by the multiple receiver beams 24. The informational content of each beam may then be treated in the same manner as the single-beam system, for displaying purposes.

Figure 2A:
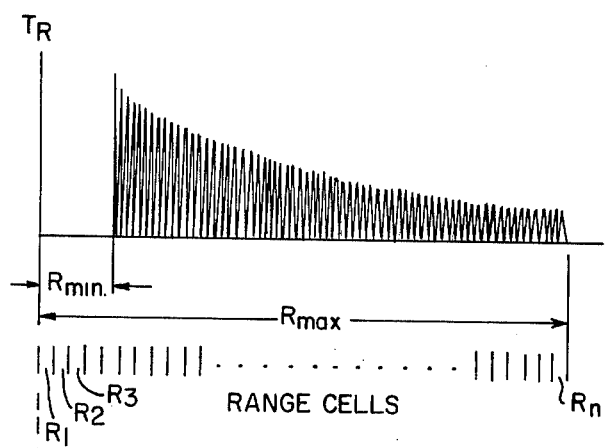
FIGS. 2A through 2C illustrate idealized side-looking sonar signals.

FIG. 2A represents an idealized side-looking sonar signal in the absence of a target. Signal amplitude is plotted on the vertical axis and range is plotted on the horizontal axis, also representing time. In FIG. 2A it is seen that after an acoustic transmission takes place at $T_R$, the signal is presented from a certain minimum range of interest $R_{min}$ out to a maximum range of interest $R_{max}$ with the signal starting at a maximum and decreasing thereafter as a function of range. The range along the bottom is divided up into units or range cells designated $R_1$ to $R_n$.

Figure 2B:
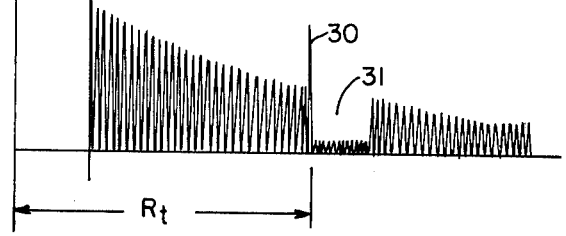

FIG. 2B illustrates the same signal with a target present at range $R_t$, the target being indicated by the signal highlight 30 followed by a shadow portion 31 where no signal is present.

Most side-looking sonar displays include time-varying gain apparatus which normalizes the signal so that a relatively smooth bottom produces a uniform intensity on the display from the minimum to maximum range of interest.

Figure 2C:
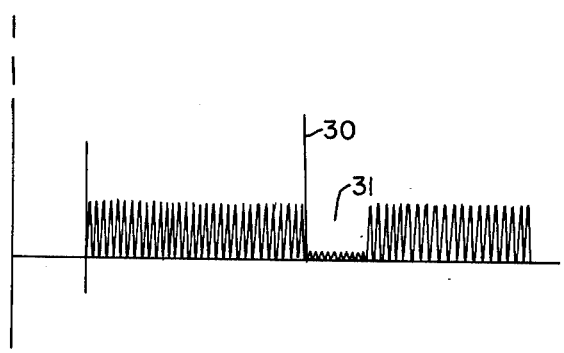

FIG. 2C, therefore, illustrates the side-looking sonar signal of FIG. 2B with time varying gain applied, resulting in a normalized signal.

Figure 3:
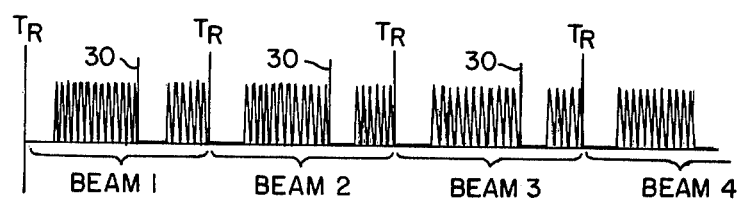
FIG. 3 illustrates idealized side-looking sonar signals for a multi-beam system such as in FIG. 1B.

For the multi-beam case of FIG. 1B, the signal associated with each beam may be presented sequentially as illustrated in FIG. 3 where, by way of example, the target highlight 30 may show up in three of the beams but not the fourth.

Figure 4:
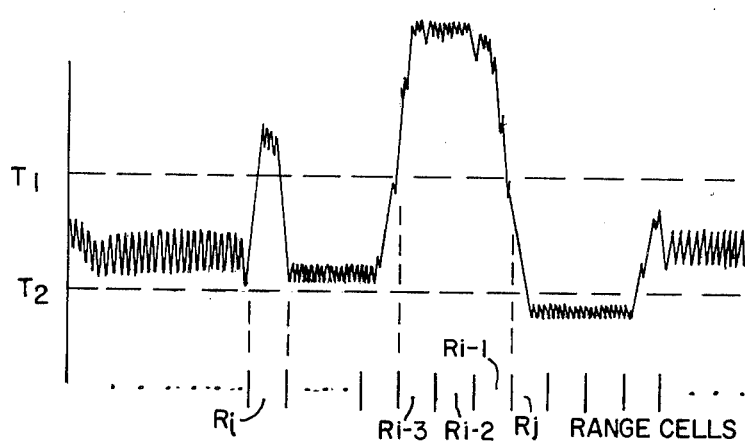
FIG. 4 illustrates a portion of typical side-looking sonar signal.

FIG. 4 illustrates a portion of a typical side-looking sonar signal which in the present invention is examined to see if there are signal levels above a first predetermined threshold $T_1$, indicative of a target highlight, and below a second predetermined threshold $T_2$, indicative of a target shadow, in the range cells. Thus in FIG. 4, a shadow appears beginning at range cell $R_j$ and a j-3 appears just previous to that for range cells $R_j$ to $R_{j-1}$. In the present invention a possible target is indicated when a highlight is present or in one embodiment, when the highlight is of a certain duration, for example at least two range cells and it is immediately followed by a shadow of a duration dependent upon the range of cell $R_j$.

Although the signal exceeded threshold $T_1$ at range cell $R_i$ no target will be indicated since the level is not exceeded for at least two range cells and it is not followed by a shadow.

Figure 5:
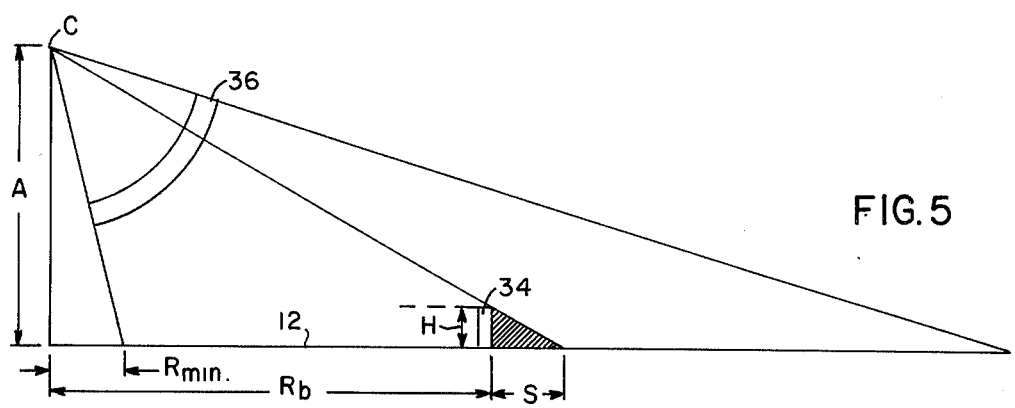
FIG. 5 is a diagram illustrating certain measurements utilized herein.

FIG. 5 illustrates the geometry with respect to operation of the side-look sonar apparatus. The apparatus at position C operates at an altitude A above the target area 12. A target 34 of height H is located at a bottom range of $R_b$. A transmitted acoustic pulse 36 will insonify the narrow strip on the target area 12 and the apparatus will process the signal from the mimimum range to the maximum range, with a target highlight from target 34 being evident in the return signal. The bottom area behind the target lies in an acoustic shadow thus causing an interruption in the signal as previously described. The length S of the shadow is a function, H/A, of the range $R_b$ to the shadow, where A is the operating altitude and H is a chosen minimum target height to be detected. That is:

$$S = HR_b/A$$

By way of example, if the operating altitude is 30 feet and the minimum H to be detected is 1.5 feet, the shadow length S should be at least approximately 5% or 1/20 of the bottom range $R_b$.

Figure 6:
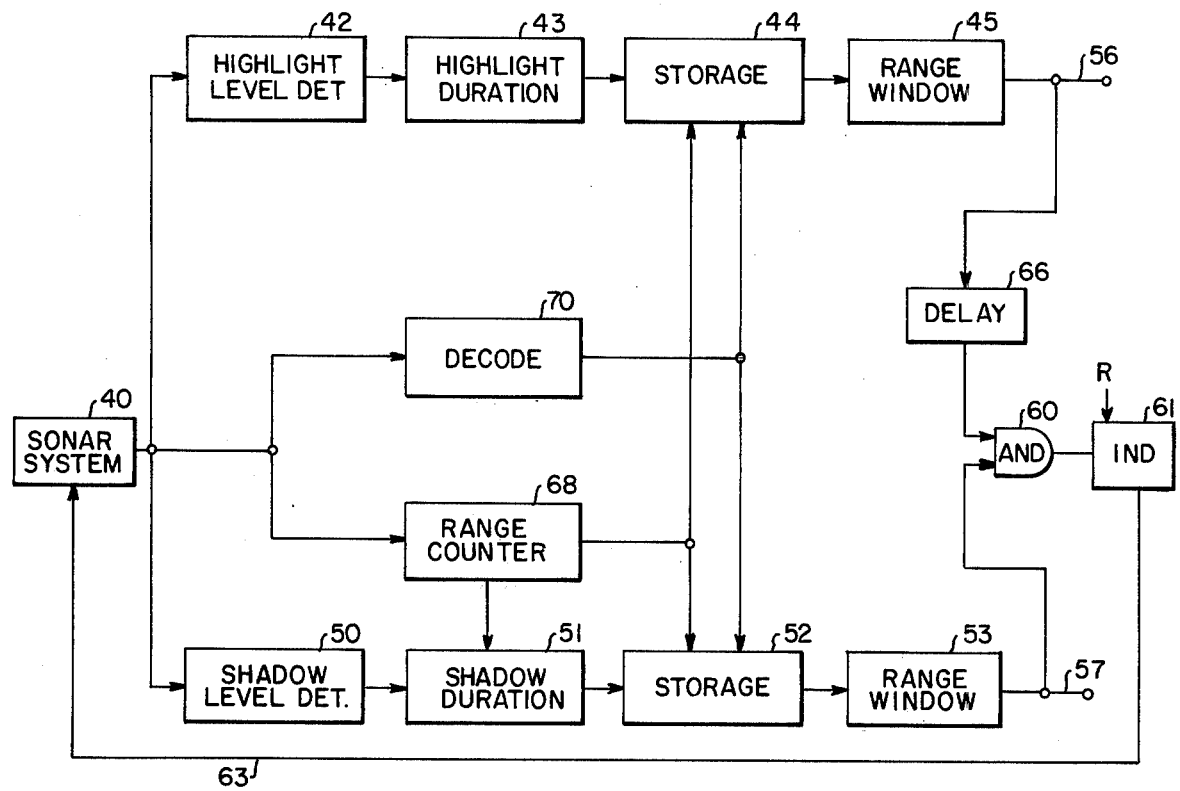
FIG. 6 is a block diagram illustrating one embodiment of the present invention.

FIG. 6 illustrates in block diagram form one embodiment of the present invention for use with a side-looking sonar system 40 which provides the repetitive line scanned signals indicative of a target area. The automatic target detection apparatus includes a first circuit means for determining the presence of a highlight in the signal provided and for determining whether the highlight exceeds a predetermined time duration, that is whether the highlight extends over a number of range cells. These functions are accomplished by the provision of highlight level detect circuit 42 and highlight duration circuit 43.

The circuit means includes a memory or storage 44 for storing the results of possible target indications at locations corresponding to the range cells, and a range window circuit 45 may be provided to account for targets that may be skewed with respect to direction of travel as will be explained.

A second circuit means is provided for determining the presence of a shadow in the received signal and for determining the duration of the shadow as a function of its occurrence in the signal. This is accomplished with the provision of the shadow level detect circuit 50 and the shadow duration circuit 51 which provides an output signal, when a valid shadow is detected, to the storage circuitry 52 functioning in an identical manner as storage 44. To accommodate for skewed targets, a range window circuit 53 is provided.

Any output from range window 45 on output line 56 indicates the presence of a valid target highlight and any output from range window 53 on output line 57 indicates the presence of a valid shadow. In accordance with one mode of operation, a valid possible target will be indicated when both a valid highlight and vaid shadow are present. Accordingly, both signals are provided to an AND gate 60 which will provide an output signal when both are present, to indicator device 61 which in turn will alert the operator such as for example by an audio or visual signal and may additionally be operable to supply, via lead 63, a cueing signal to the sonar display for marking the possible target. Since the valid target highlight indication occurs a number of range cells before the valid target shadow indication, a delay circuit 66 is interposed between the highlight output line 56 and the AND gate 60 to insure that if both signals are present, they will appear at AND gate 60 at the respective proper time.

Since various data are to be stored at various range cell locations, there is provided a range counter 68 for addressing both storage 44 and 52 and may also be conveniently utilized for the determination of the shadow duration.

For a multi-beam system, the storage may include a plurality of sections for storing information in respective beams. In order to enable these different sections for storage of information of the different beams, there is provided a decode circuit 70 which is responsive to the commencement of the acoustic transmissions for sequentially providing N enabling signals for an N beam system.

Figure 7:
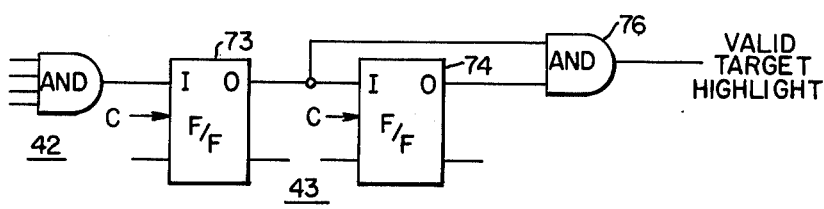
FIG. 7 is a block diagram illustrating the target highlight and duration detection circuitry of FIG. 6.

The sonar signal such as illustrated in FIG. 4 is an analog representation of the reverberation from a relatively narrow insonified strip of the target area. For ease and speed of signal processing many sonar systems convert the analog signal into equivalent digital form so that for example for each range cell the signal amplitude may be represented by a multi-bit digital number. Operation of the present invention will be described by way of example with respect to a four-bit digital signal being provided by the side-looking sonar system 40 where the presence of all ones indicates a highlight and the presence of all zeros indicates a shadow. Accordingly, and as illustrated in FIG. 7, the highlight level detector 42 may be an AND gate which will provide an output signal if its four input signals are all ones.

The highlight duration circuit 43 may be a multistage shift register with the number of stages utilized being indicative of the predetermined number of range cells over which the target highlight must be present. Thus, if the criteria is that the target highlight must be present for at least two range cells, the highlight duration circuit 43 may include two flip-flops 73 and 74 each being of the type which transfers the signal appearing at its input I to its output O upon the provision of a clock pulse C, commonly provided by a master oscillator, with each clock pulse corresponding to a range cell.

The outputs from each of the flip-flops 73 and 74 are provided to an AND gate 76 which provides an output signal indicative of a valid target highlight when both flip-flops 73 and 74 are providing one outputs. If for a certain range cell the threshold is exceeded, the AND gate of the highlight level detector 42 will provide a one output signal to place flip-flop 73 into a set condition providing a one at its output O, upon the occurrence of a clock pulse C. AND gate 76 therefore receiving a one and a zero input will not provide an output. If the threshold is exceeded on the next range cell, flip-flop 73 will continue to provide a one output signal and the one input signal at flip-flop 74 will cause a one output signal upon the occurrence of the next clock pulse such that AND gate 76 receiving both one inputs will provide an output signal indicative of a valid target highlight and which signal is stored at a location correspondng to its particular range cell. This operation is accomplished in the storage circuit 44 illustrated in more detail in FIG. 8 to which reference is now made.

For a four-beam system the storage 44 may include four sections in the form of random access memories (RAMs) 80 to 83 individually enabled by decode circuit 70 which receives a transmit sync signal $T_R$ and is operable to provide sequential enabling signals on lines 86 to 89 in response to sequential snyc signals, to respectively enable RAMs 80 to 83.

After each transmit signal, range counter 68 is operable in reponse to the clock pulses C, to provide the RAMs with address signals indicative of the range cells so that any output signal from AND gate 76 indicative of a valid target highlight will be stored for its particular beam at a range cell location in one of the RAMs.

For many operations it may be desirable to provide an operator indication of a possible target only if the target is of a minimum length in the direction of carrier travel so that highlights will be indicated for a particular range cell for a number of consecutive transmissions, for example for four consecutive transmissions, or in four adjacent beams. Practically however it is desirable to look for these highlights in several adjacent range cells as well as beams in order to detect objects lying at an angle to the path of the carrier and thus not appearing at exactly the same range cell on each successive beam. For example and with reference to FIG. 9, if the long dimension of target 92 were perpendicular to the beams, the target would be detected in the same range cells in all four beams. Target 92 however is skewed relative to the beams (and accordingly relative to the carrier direction) so that it would not register, if the criteria were for four successive hits. In order to accommodate for such situation, the circuitry may be designed to provide a target indication even if it is skewed. This is accomplished with the provision of range window 45 (FIG. 8) which provides a range window of eight range cells for example by means of eight bit shift registers 96 to 99 which receive highlight indications from respective RAMs 80 to 83 each time they are addressed by the range counter 68. It is to be noted that all of the RAMs are addressed simultaneously by the range counter 68 but only that RAM enabled by the decode circuit 70 will accept the valid target highlight signal from AND gate 76. Each time a location is addressed however it will output to a respective shift register 96 to 99 without the requirement for an enabling signal, so that the contents of RAMs 80 to 83 are read out concurrently. The eight bits of each storage register are provided to respective OR gates 100 to 103 so that if a highlight indication is present in one or more locations of the shift register, its respective OR gate will provide an output signal to AND gate 106 the output of which indicates four successive highlights (bits in four adjacent beams) within a range window of eight cells.

Figure 10:
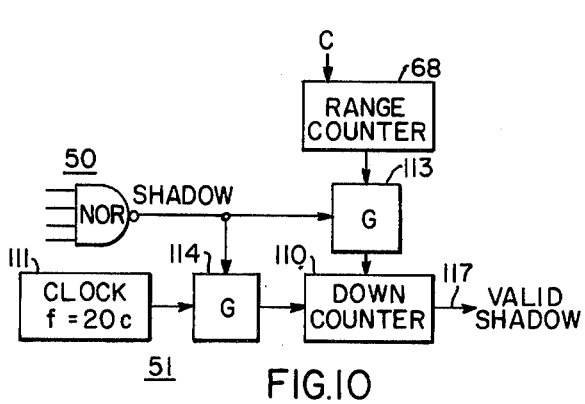
FIG. 10 is a block diagram illustrating the shadow level detection and duration determining circuitry of FIG. 6 in somewhat more detail.

In accordance with one aspect of the present invention a possible target will be indicated if the highlight is followed by a shadow of a predetermined time duration. FIG. 10 illustrates by way of example one of a variety of ways of accomplishing this determination. With the assumption that a shadow is indicated by the presence of all zeros, the shadow level detector 50 may be a NOR gate which provides an output signal only when all of its input signals are zeros.

The shadow duration circuitry 51 includes a down counter 110 and an oscillator or clock whose frequency is proportional to the range cell clock, and in the present example the clock frequency f will be 20 times the range cell clock frequency a. In the absence of a shadow output from the shadow level detector 50, gate 113 is operable to transfer the count in range counter 68 to down counter 110, so that down counter 110 tracks range counter 68. When a shadow is detected, gate 114 is operable to gate the pulses from clock 111 into down counter 110 which then counts down from its present count. The shadow indication has the effect of disabling gate 113 so that the transfer of the running range count does not take place to the down counter.

By way of example, let it be assumed that a shadow indication occurs at range cell 100. Down counter 110 will have a count of 100 in it and will start counting down the pulses supplied by clock 111. If the down counter 110 attains a count of zero for the duration of the shadow signal, an output signal will be provided on lead 117 indicative of a valid shadow. Since the shadow indication occurred at range cell 100 the shadow must be at least 20% of that range or 5 range cells. When the range counter reaches a count of 101 the down counter will have attained a count of 80. When the range counter reaches the next count of 102 the down counter will have attained a value of 60. With the range counter at cell 103 the down counter will have a count of 40, when at 104 the down counter will have a count of 20 and when at 105 the down counter will have a count of zero thus indicating that the shadow has lasted for the prerequisite number of range cells and the valid shadow indication will be stored, starting at a location corresponding to range cell 105. If the shadow for example disappears when the range counter is at a count of 102, the down counter will not have attained a count of zero, gate 113 will again be enabled while gate 114 will be disabled and the current count (102) will be transferred to the down counter 110 to await a subsequent shadow indication.

Figure 8:
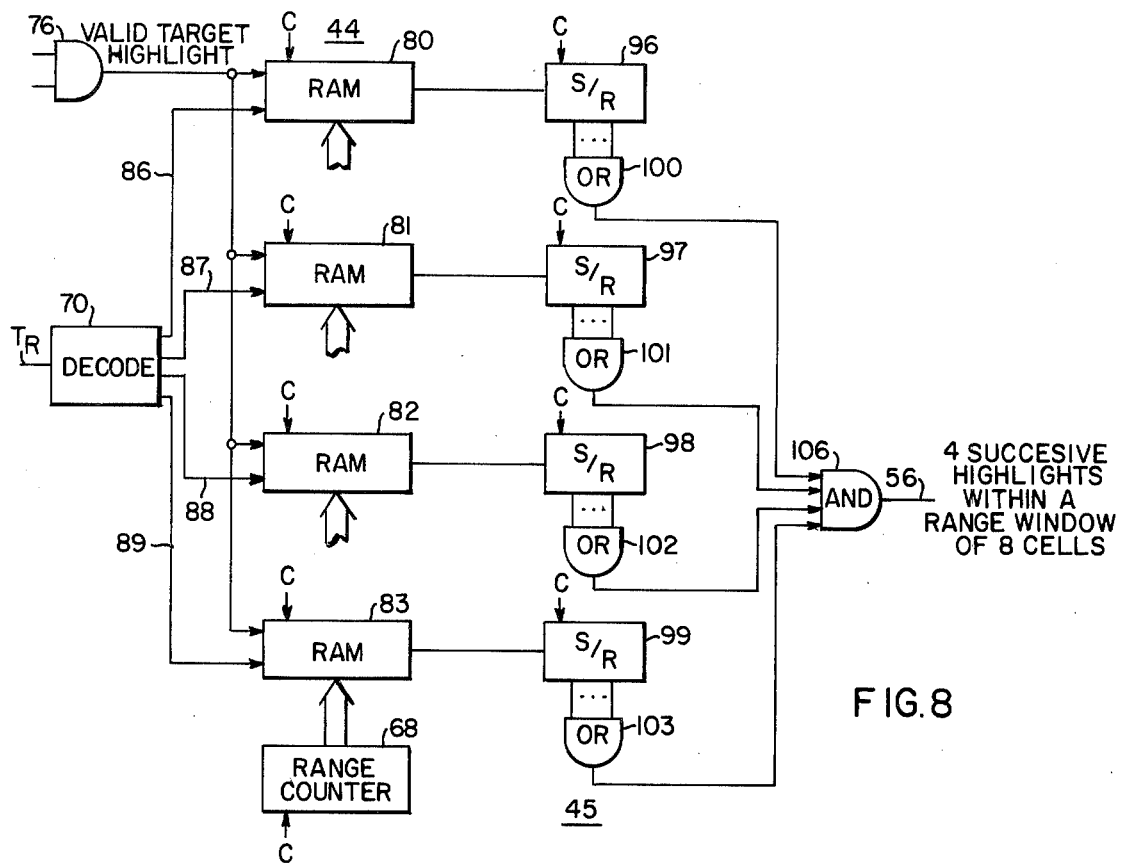
FIG. 8 is a block diagram illustrating the storage portion of FIG. 6 in somewhat more detail in addition to illustrating the range window circuitry.
Figure 9:
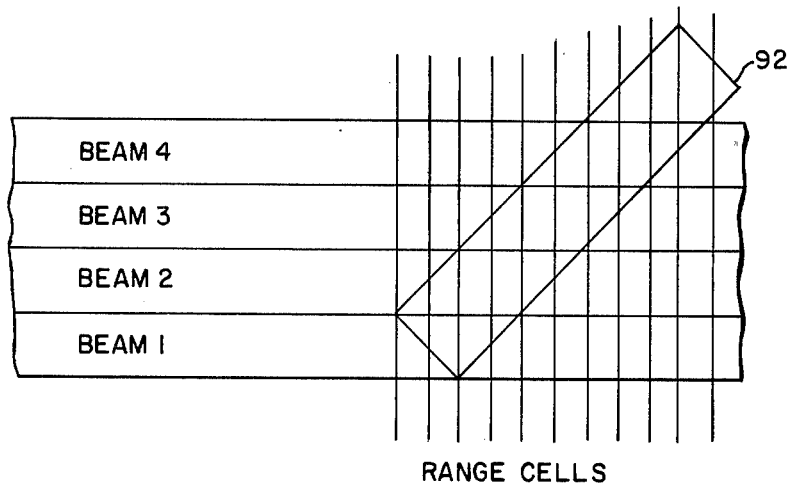
FIG. 9 illustrates a target skewed with respect to the side-looking sonar beams and extending over a plurality of range cells.

The valid shadow indication on lead 117 is placed into storage 52 (FIG. 6) which may be identical to that previously described in FIG. 8. The same criteria for a highlight extending over a number of range cells is applicable to the shadow and accordingly range window 53 may be identical to range window 45 of FIG. 8 except that the ouput AND gate would be indicative of four successive shadows within the range window.

Figure 11:
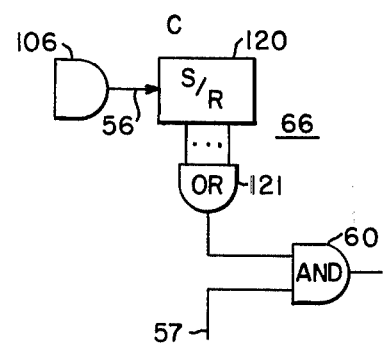
FIG. 11 illustrates the delay network of FIG. 6 in more detail.

In FIG. 11 there is illustrated one type of delay means 66 operative to act as a controlled delay of the four successive hit indication, until the four successive shadow information arrives at AND gate 60. The delay means includes a shift register 120 the stages of which are provided to OR gate 121 such that if AND gate 106 provides an output signal, it will be shifted down the shift register 120 upon the provisions of each clock pulse C and, if present, will also appear at the input to AND gate 60 for a predetermined period of time depending upon the length of shift register 120.

Although the term side-looking energy or side-looking sonar is utilized herein such terms are generic to include for example angle looking or forward looking systems; in general, any system where energy scans from adjacent narrow strips are displayed as a function of time corresponding to range.

We claim:

1. Automatic target detection apparatus comprising:
  A. means providing a plurality of repetitive line scanned signals indicative of a target area of interest;
  B. said signals being subject to signal levels above a first predetermined threshold (highlight) and below a second predetermined threshold (shadow);
  C. first circuit means responsive to said signals for determining the presence of a highlight; and
  D. second circuit means responsive to said signals for determining the presence of a shadow and for determining the duration of said shadow as a function of its position in said signal.

2. Apparatus according to claim 1 wherein:
  A. said signals are divided into a plurality of corresponding range cells; and which includes
  B. first storage means having a plurality of storage locations corresponding to said range cells;
  C. means for storing signal highlight indications at corresponding ones of said storage locations.

3. Apparatus according to claim 1 wherein:
  A. said signals are divided into a plurality of corresponding range cells; and which includes
  B. second storage means having a plurality of storage locations corresponding to said range cells;
  C. means for storing signal shadow indications at corresponding one of said storage locations.

4. Apparatus according to claim 1 which includes,
  A. means for indicating the presence of a target only when both said (a) highlight and (b) said shadow exceeding a predetermined duration are present in a signal.

5. Apparatus according to claim 1 which includes,
  A. means for indicating the presence of a target only when both said (a) highlight and (b) said shadow exceeding a predetermined duration are present in a plurality of sequential ones of said repetitive signals.

6. Apparatus according to claim 1 which includes,
  A. means for indicating the presence of a target only when both said (a) highlight and (b) said shadow exceeding a predetermined duration are present in a plurality of sequential ones of said repetitive signals and over a predetermined range window.

7. Apparatus according to claim 1 wherein said second circuit means includes:
  A. a range counter operable to provide a running output signal corresponding to a plurality of range cells;
  B. a second counter;
  C. means for transferring the count in said range counter to said second counter in the absence of a shadow;
  D. means for inhibiting said transfer with the presence of a shadow and for counting down the existing count in said second counter; and
  E. means for indicating the presence of a valid shadow if said second counter is counted down to a predetermined value.

8. Apparatus according to claim 7, wherein said means for counting down includes:
  A. an oscillator having a frequency A/H times the frequency of said range counter where A is the operating altitude and H a chosen minimum target height to be detected;
  B. said oscillator providing its output signal to said second counter.

9. An automatic target detector for side-looking energy apparatus of the type which travels over a target area at an operating altitude and provides repetitive side-looking energy signals indicative of said target area, comprising:
  A. means responsive to a side-looking energy signal for determining the presence of a target highlight and shadow, indicative of a possible target; and
  B. means for indicating the presence of said possible target only when the equivalent length S of said shadow is proportional to the range to said shadow by a predetermined factor.

10. Apparatus according to claim 9 wherein:
  A. said predetermined factor is H/A, where H is a chosen minimum target height and A is the side-looking energy operating altitude, and wherein the range is bottom range measured from a point on the target area below said apparatus out to said shadow.

11. An automatic target detector for a side-looking sonar system of the type which travels over a target area and forms a plurality of adjacent receiver beams during said travel, to provide side-looking sonar signals, comprising:
  A. means for examining said signals in successive periods of time corresponding to range cells, for determining the presence of signal highlight and shadows;
  B. means for indicating the presence of a target only when said signal highlight and shadow are present in a predetermined plurality of adjacent receiver beams and within a range window of a predetermined plurality of range cells.

12. Apparatus according to claim 11 wherein said system is a multibeam system which forms a plurality of adjacent receiver beams and which includes:
  A. first storage means for storing highlight indications at predetermined locations corresponding to said range cells;
  B. second storage means for storing shadow indications at predetermined locations corresponding to said range cells;
  C. said first and second storage means being divided into N similar sections for an N beam system; and
  D. means for sequentially enabling said sections for the storage of information.

* * * * *